US012750694B2

(12) United States Patent
Mehta et al.

(10) Patent No.: US 12,750,694 B2
(45) Date of Patent: Sep. 29, 2026

(54) CARRIER AGGREGATION AND DUAL CONNECTIVITY SWITCHING IN A CELLULAR NETWORK

(71) Applicant: DISH WIRELESS L.L.C., Englewood, CO (US)

(72) Inventors: Dhaval Mehta, Aldie, VA (US); Sourabh Gupta, Ashburn, VA (US); Gurpreet Sohi, Parker, CO (US)

(73) Assignee: DISH Wireless L.L.C., Englewood, CO (US)

( * ) Notice: Subject to any disclaimer, the term of this patent is extended or adjusted under 35 U.S.C. 154(b) by 498 days.

(21) Appl. No.: 18/217,952

(22) Filed: Jul. 3, 2023

(65) Prior Publication Data

US 2024/0349063 A1 Oct. 17, 2024

Related U.S. Application Data

(60) Provisional application No. 63/458,609, filed on Apr. 11, 2023.

(51) Int. Cl.
*H04W 16/10* (2009.01)
*H04W 24/02* (2009.01)
(Continued)

(52) U.S. Cl.
CPC ........... *H04W 24/02* (2013.01); *H04W 16/10* (2013.01); *H04W 36/0058* (2018.08); (Continued)

(58) Field of Classification Search
CPC ......... H04W 36/0058; H04W 72/0453; H04W 36/08; H04W 16/10; H04W 24/08; (Continued)

(56) References Cited

U.S. PATENT DOCUMENTS 6,724,746 B1 * 4/2004 Linden ................ H04L 12/6418 370/349
9,949,183 B2 4/2018 Axmon et al.
(Continued)

FOREIGN PATENT DOCUMENTS

CN 101494908 B 6/2012
WO 2021/173339 A1 9/2021

OTHER PUBLICATIONS

Dhaval Mehta et al., "Carrier Aggregation and Dual Connectivity Switching in a Cellular Network," U.S. Appl. No. 18/217,936, filed Jul. 3, 2023. (45 Pages).
(Continued)

*Primary Examiner* — Anez C Ebrahim
(74) *Attorney, Agent, or Firm* — Christopher Wickstrom; Frontier IP Law PLLC

(57) ABSTRACT

Embodiments are directed towards systems and methods for carrier aggregation and dual connectivity switching in a cellular network (e.g., a 5G network). Example embodiments include systems and methods for: the RAN functions supporting providing measuring and reporting particular items for dynamic carrier aggregation and dual connectivity switching; RAN dynamic carrier aggregation and dual connectivity switching with a network intelligence layer; RAN dynamic carrier aggregation and dual connectivity switching without a network intelligence layer; RAN dynamic carrier aggregation and dual connectivity switching based on availability of an inter-DU link and meeting latency/bandwidth criteria; RAN dynamic carrier aggregation and dual connectivity switching based on availability of an inter-DU link and meeting resource criteria; and prioritization for using CA instead of DC based on CQI information reported from UEs.

20 Claims, 11 Drawing Sheets

(51) Int. Cl.
*H04W 36/00* (2009.01)
*H04W 36/08* (2009.01)
*H04W 72/0453* (2023.01)
*H04W 76/15* (2018.01)
*H04W 88/06* (2009.01)
*H04W 92/20* (2009.01)

(52) U.S. Cl.
CPC ....... *H04W 36/0069* (2018.08); *H04W 36/08* (2013.01); *H04W 72/0453* (2013.01); *H04W 76/15* (2018.02); *H04W 88/06* (2013.01); *H04W 92/20* (2013.01)

(58) Field of Classification Search
CPC ... H04W 76/15; H04W 24/02; H04W 88/085; H04W 36/0069
See application file for complete search history.

(56) References Cited

U.S. PATENT DOCUMENTS

| | | | |
|---|---|---|---|
| 10,206,147 B2 | 2/2019 | Horn et al. | |
| 10,263,729 B2 | 4/2019 | Vikberg et al. | |
| 10,368,393 B2 | 7/2019 | Lunden et al. | |
| 10,485,000 B2 | 11/2019 | Shaheen et al. | |
| 10,638,377 B2 | 4/2020 | Futaki et al. | |
| 10,644,974 B2 | 5/2020 | Novlan et al. | |
| 10,873,916 B2 | 12/2020 | Park et al. | |
| 11,272,560 B1 | 3/2022 | Vivanco et al. | |
| 11,297,519 B2 | 4/2022 | Kubota et al. | |
| 11,363,656 B2 | 6/2022 | Adusumilli et al. | |
| 11,589,406 B2 | 2/2023 | Venkatachari et al. | |
| 11,641,602 B2 | 5/2023 | Patil et al. | |
| 11,711,863 B2 | 7/2023 | Willars et al. | |
| 11,785,511 B2 | 10/2023 | Teyeb et al. | |
| 12,063,558 B2 | 8/2024 | Zirwas et al. | |
| 12,096,499 B2 | 9/2024 | Liu et al. | |
| 2008/0226094 A1* | 9/2008 | Rutschman | H04M 1/6066 381/79 |
| 2013/0083672 A1 | 4/2013 | Johansson et al. | |
| 2015/0304116 A1* | 10/2015 | Chan | H04W 28/02 370/230 |
| 2016/0066357 A1 | 3/2016 | Goldhamer | |
| 2016/0242080 A1 | 8/2016 | Vikberg et al. | |
| 2016/0373972 A1 | 12/2016 | Vesely et al. | |
| 2017/0118658 A1 | 4/2017 | Hwang et al. | |
| 2018/0014218 A1 | 1/2018 | Kubota et al. | |
| 2018/0324780 A1 | 11/2018 | Novlan et al. | |
| 2018/0368137 A1 | 12/2018 | Yin et al. | |
| 2019/0208478 A1 | 7/2019 | Park et al. | |
| 2019/0387561 A1 | 12/2019 | Paladugu et al. | |
| 2020/0015132 A1 | 1/2020 | Liu et al. | |
| 2020/0034165 A1 | 1/2020 | Chou et al. | |
| 2020/0107232 A1 | 4/2020 | Dong et al. | |
| 2020/0112959 A1 | 4/2020 | Gong et al. | |
| 2020/0367101 A1 | 11/2020 | Paladugu et al. | |
| 2020/0395976 A1 | 12/2020 | Tanaka | |
| 2021/0051502 A1 | 2/2021 | Yamada et al. | |
| 2021/0075567 A1 | 3/2021 | Van et al. | |
| 2021/0144760 A1 | 5/2021 | Ozturk et al. | |
| 2021/0160942 A1 | 5/2021 | Venkatachari et al. | |
| 2021/0267000 A1 | 8/2021 | Jain et al. | |
| 2021/0274406 A1* | 9/2021 | Ode | H04W 36/0058 |
| 2021/0410216 A1 | 12/2021 | Liu et al. | |
| 2022/0006592 A1 | 1/2022 | Yang et al. | |
| 2022/0015131 A1 | 1/2022 | Cheng et al. | |
| 2022/0030659 A1 | 1/2022 | Kim | |
| 2022/0046522 A1 | 2/2022 | Kim et al. | |
| 2022/0117026 A1 | 4/2022 | Kwok et al. | |
| 2022/0132405 A1 | 4/2022 | Schwarzmeier et al. | |
| 2022/0141722 A1 | 5/2022 | Patil et al. | |
| 2022/0201685 A1 | 6/2022 | Tamura et al. | |
| 2022/0322418 A1 | 10/2022 | Kim et al. | |
| 2022/0400470 A1 | 12/2022 | Kusashima et al. | |
| 2023/0110752 A1 | 4/2023 | Wolman et al. | |
| 2023/0112465 A1 | 4/2023 | Vadapalli et al. | |
| 2023/0276465 A1 | 8/2023 | Song et al. | |
| 2024/0015733 A1 | 1/2024 | Dhungana et al. | |
| 2024/0089704 A1 | 3/2024 | Shrivastava et al. | |
| 2024/0121855 A1 | 4/2024 | Kwok et al. | |
| 2024/0163756 A1 | 5/2024 | Kulkarni et al. | |
| 2024/0196449 A1 | 6/2024 | Paladugu et al. | |
| 2024/0244688 A1 | 7/2024 | Sheik et al. | |
| 2024/0297770 A1 | 9/2024 | Abdelghaffar et al. | |
| 2024/0314544 A1 | 9/2024 | Cao et al. | |
| 2024/0349079 A1 | 10/2024 | Mehta et al. | |

OTHER PUBLICATIONS

Dhaval Mehta et al., "Carrier Aggregation and Dual Connectivity Switching in a Cellular Network," U.S. Appl. No. 18/217,940, filed Jul. 3, 2023, (49 Pages).
Dhaval Mehta et al., "Carrier Aggregation and Dual Connectivity Switching in a Cellular Network," U.S. Appl. No. 18/217,946, filed Jul. 3, 2023. (45 Pages).
Dhaval Mehta et al., "Carrier Aggregation and Dual Connectivity Switching in a Cellular Network," U.S. Appl. No. 18/217,957, filed Jul. 3, 2023. (46 Pages).
Anonymous, 3GPP Releases 16 & 17 & Beyond, Jan. 1, 2021, 5G Americas, White Paper.
Ericsson, Enhancements to Integrated Access and Backhaul for NR, Feb. 14, 2022, 3GPP Draft; R2-22034471, 3rd Generation Partnership Project, WG2 / Feb. 21, 2022-Mar. 3, 2022.
Ericsson, Introducing Enhancements to Integrated Access and Backhaul for NR, Mar. 15, 2022, 3GPP Draft; RP-220486, 3rd Generation Partnership Project, RAN WG2 / Feb. 21, 2022-Mar. 3, 2022.
International Search Report and Written Opinion received for PCT Patent Application No. PCT/US24/20452, mailed on Aug. 20, 2024, 18 pages.

* cited by examiner

CARRIER AGGREGATION AND DUAL CONNECTIVITY SWITCHING IN A CELLULAR NETWORK

TECHNICAL FIELD

The present disclosure relates generally to cellular telecommunication networks and, more particularly, to carrier aggregation and dual connectivity switching in a cellular network.

BRIEF SUMMARY

The advent and implementation of Fifth Generation (5G) cellular wireless technology has resulted in faster speeds and increased bandwidth. 5G provides a broad range of wireless services delivered to the end user across multiple access platforms and multi-layer networks. 5G is a dynamic, coherent and flexible framework of multiple advanced technologies supporting a variety of applications. 5G utilizes an intelligent architecture, with Radio Access Networks (RANs) not constrained by base station proximity or complex infrastructure. 5G enables a disaggregated, flexible and virtual RAN with interfaces creating additional data access points. 5G network functions may be completely software-based and designed as cloud-native, meaning that they are agnostic to the underlying cloud infrastructure, allowing higher deployment, agility and flexibility.

With the advent of 5G, industry experts defined how the 5G core (5GC) network should evolve to support the needs of 5G New Radio (NR) and the advanced use cases enabled by it. The 3rd Generation Partnership Project (3GPP) develops protocols and standards for telecommunication technologies including RAN, core transport networks and service capabilities. 3GPP has provided complete system specifications for 5G network architecture which is much more service oriented than previous generations.

Carrier Aggregation (CA) introduced by 3GPP is a software functionality in Radio Access Networks (RANs) and user equipment devices (UEs) which allows Mobile Network Operators (MNOs) to combine the capabilities of radio cells at distinct frequency allocations to enhance the end user experience.

Each frequency layer, known as a carrier, has specific characteristics in terms of coverage (the range around the antenna where signals can still be received) and capacity (bandwidth, data rates, throughput). Carriers in the higher frequency ranges typically provide greater capacity, while carriers in the lower range provide wider or deeper coverage. The coverage is impacted by two effects. Firstly, lower frequencies translate into larger wavelengths, which propagate better, and reach deeper indoors. Secondly, lower frequency bands are typically used in FDD (Frequency Division Duplex) mode, which has higher uplink signal strength compared to TDD (Time Division Duplex) mode, which is almost exclusively used for cellular allocations above 2.5 GHZ. The mid-band frequencies, for example, the 3.5 GHz band (or n78 in 3GPP terminology), are known to provide a good combination of capacity and coverage.

In most markets worldwide, national regulators have awarded spectrum licenses to MNOs in the form of carriers in allocated frequency bands. Several operators may have access to carriers in a specific band and there can be several carriers per operator in a band. Consequently, operators may have access to low bandwidth carriers in the low-frequency bands (e.g., as little as 10 MHz of bandwidth in some allocations below 1 GHZ). On mid to high frequency bands, such as n78, allocations are likely to be larger, reaching 100 MHz or even more per operator. It is helpful to use CA to get the best 5G performance out of the available spectrum assets and increase spectral efficiency.

At the cell edge, CA brings another benefit to the user. In particular, coverage is typically limited by uplink, not by downlink. That means that in downlink the cell could reach further than in uplink. However, for a stable connection one needs both downlink and uplink. This is where CA may help in that CA allows the use of downlink for all aggregated cells, while securing the connection stability through a common uplink on the lower aggregated carrier. Especially when aggregating low and mid bands, CA does not only boost data rates, but also the range in which the user will benefit from it. CA is important to turning the cumulative spectrum bandwidth of all these allocations into higher data rates for end users.

CA occurs across cells that are each managed by different respective DUs of a plurality of DUs of a wireless cellular telecommunication network that provides wireless cellular telecommunication network services to UEs. However, in implementing CA, currently there are no standardized interfaces available for inter-DU Communication in the RAN.

Turning to FIG. 1, illustrated is a network diagram of an example network 100 including an example of communication interfaces between distributed units (DUs) and a centralized unit (CU) of a wireless cellular telecommunication network.

Vendors have developed vendor-specific interfaces to perform inter-DU communication. Currently, inter-vendor communication is not possible (e.g., DU1-vendor 1, DU2-vendor 2).

However, a standardized interface between CU-DU (the 5G F1 Interface) is commercially available that can work in an intra and inter-vendor scenario (CU-vendor 1, DU-vendor 2, vice-versa). The Carrier Aggregation feature introduced by 3GPP splits packets at the 5G Medium Access Control (MAC) layer between cells that are aggregated. The MAC layer receives both the user plane and control plane data from the set of logical channels provided by the Radio Link Control (RLC) layer. The packet transfer of the RLC Packet Data Units (PDUs) between aggregated cells are done using vendor-specific interfaces. Currently, all carrier aggregation for cells that are managed by separate DUs are through vendor-specific interfaces. For example, as shown in FIG. 1, CA across cells 1-9 managed by distributed unit 2 (DU2) and cells 9-18 managed by distributed unit 2 (DU3) requires a vendor-specific interface.

To mitigate the lack of a standardized inter-DU interface, 3GPP has introduced a Dual Connectivity (DC) feature that uses the standardized 5G F1 interface to split the Packet Data Convergence Protocol (PDCP) packets across different DUs and therefore this DC feature does not require any inter-DU communication. In particular, 5G New Radio (NR) Dual Connectivity (DC) is a feature that allows mobile devices to utilize both mid-band and mmWave frequencies (LTE and FR2) to provide improved network coverage and data rate. This is done by implementing carrier aggregation which allows mobile operators to combine two or more carriers into a single data channel to increase the capacity of the network and the data rates.

5G DC using mmWave and sub-6 GHz frequencies is important to delivering multi-Gigabit speeds and the massive capacity required for a new generation of consumer and enterprise applications. Combining different types of radio spectrum enables mobile 5G devices to wirelessly achieve wired broadband-class speeds, even in challenging conditions such as crowded venues and transit hubs, in addition to powering robust 5G fixed wireless access services in homes and small businesses.

However, there is currently no mechanism available to dynamically switch between CA and DC operations. Many deployment use cases can leverage benefits of both operations, e.g., FDD-TDD mix mode, TDD-TDD only mode, FDD-FDD only mode can use CA, DC and/or a combination of both. Also, there is currently no mechanism available to make decisions for each of the UEs. There is also currently no mechanism available to switch between the two modes (CA and DC) dynamically if the inter-DU communication link is not operating as per desired operating conditions or particular criteria.

It is with respect to addressing these and other considerations that the embodiments described herein have been made. In particular, among other systems and methods, embodiments described herein provide systems and methods to dynamically switch between CA and DC operations, to make decisions for each of the UEs regarding switching between CA and DC operations, and to switch between the two modes (CA and DC) dynamically if the inter-DU communication link is not operating as per desired operating conditions or particular criteria.

Briefly described, embodiments disclosed herein are directed towards systems and methods for carrier aggregation and dual connectivity switching in a cellular network (e.g., a 5G network). Example embodiments include systems and methods for: the RAN functions supporting providing measuring and reporting particular items for dynamic carrier aggregation and dual connectivity switching; RAN dynamic carrier aggregation and dual connectivity switching with a network intelligence layer; RAN dynamic carrier aggregation and dual connectivity switching without a network intelligence layer; RAN dynamic carrier aggregation and dual connectivity switching based on availability of an inter-DU link and meeting latency/bandwidth criteria; RAN dynamic carrier aggregation and dual connectivity switching based on availability of an inter-DU link and meeting resource criteria; and prioritization for using CA instead of DC based on CQI information reported from UEs.

BRIEF DESCRIPTION OF THE SEVERAL VIEWS OF THE DRAWINGS

Non-limiting and non-exhaustive embodiments are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Figure 1:
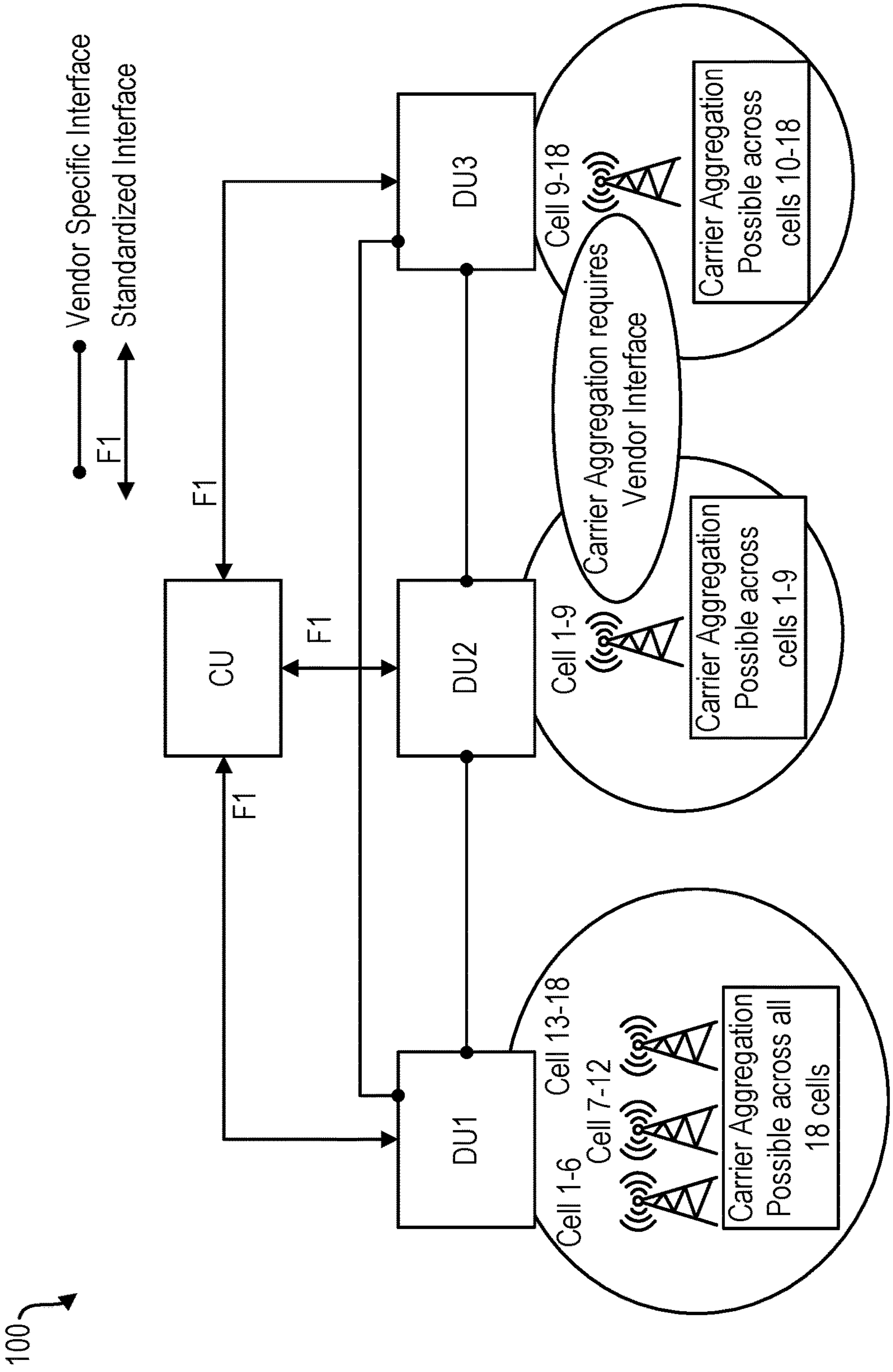
FIG. 1 illustrates a network diagram including an example of communication interfaces between distributed units (DUs) and a centralized unit (CU) of a wireless cellular telecommunication network.
Figure 2:
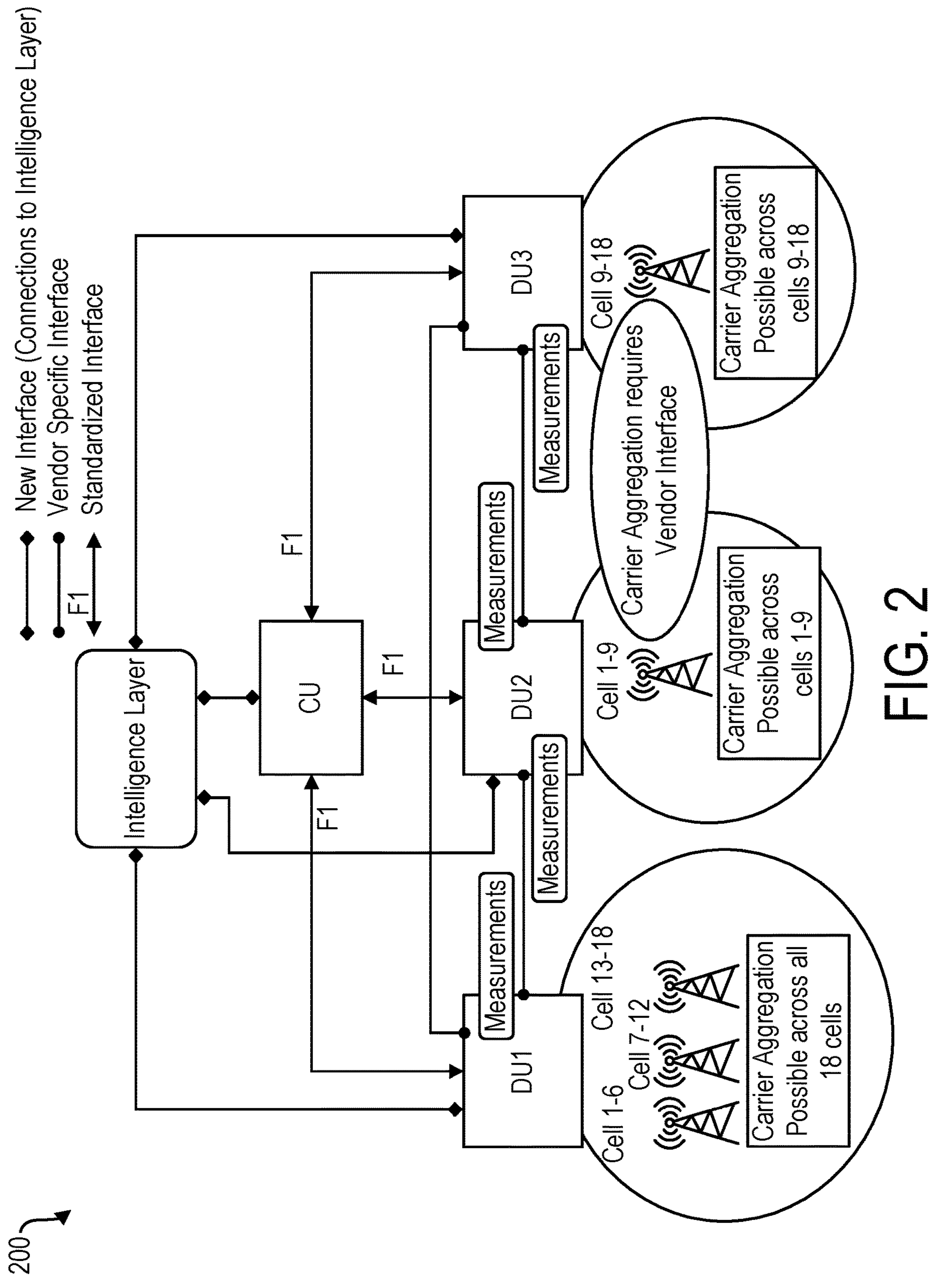
FIG. 2 illustrates a network diagram including an example intelligence layer for carrier aggregation and dual connectivity switching in a cellular network, in accordance with an example embodiment described herein.

FIG. 2 illustrates a network diagram of a network 200 including an example intelligence layer for carrier aggregation and dual connectivity switching in a cellular network, in accordance with an example embodiment described herein.

According to an example embodiment, the RAN functions support providing measuring and reporting particular items for dynamic carrier aggregation and dual connectivity switching. For example, the RAN functions may support providing measuring for and reporting the following and are not limited to providing measuring and reporting the following: UE capabilities; UE channel conditions; UE's resource demand and desired policies; UE's assigned Quality of Service (QoS)/Service Level Agreements (SLAs); inter-DU link quality, latency, bandwidth availability, and current usage.

According to an example embodiment, RAN dynamic carrier aggregation and dual connectivity switching may be provided with a network intelligence layer. The network intelligence layer is connected via a network intelligence interface to RAN Network functions (i.e., the centralized unit (CU) and DUs) within the wireless network. Thus, the deployment may work with RAN Network functions (i.e., the centralized unit (CU) and DUs) to determine the optimal operating conditions (CA or DC or both) for each UE. The network intelligence layer may be deployed anywhere within the wireless network including, but not limited to: Far Edge Location (where the DU and/or CU is deployed); a data center (where the DU and/or CU is deployed); a public cloud where DU and/or CU is deployed, management functions, and other network functions that can be deployed; an isolated logical or physical location within the network. The data center can include a local data center, a private edge data center or any other data center that is capable of supporting the RAN.

The network intelligence layer may be a separate entity or a sub-function of a network orchestrator, a RAN Intelligent Controller (RIC), or any other entity that can provide intelligent decisions based on constant feedback from RAN functions. In various embodiments, the intelligence layer may trigger the dynamic assignment of CA, DC or combination of both for each UE.

In an example embodiment, RAN dynamic carrier aggregation and dual connectivity switching may be provided without a network intelligence layer. In such an embodiment, the RAN may make the dynamic decision of switching between CA, DC or combination of both for each UE. The RAN may consider its current resource availability while making the decisions. The resources include but are not limited to central processing unit (CPU) resources, memory resources, radio spectrum, etc.

Figure 3:
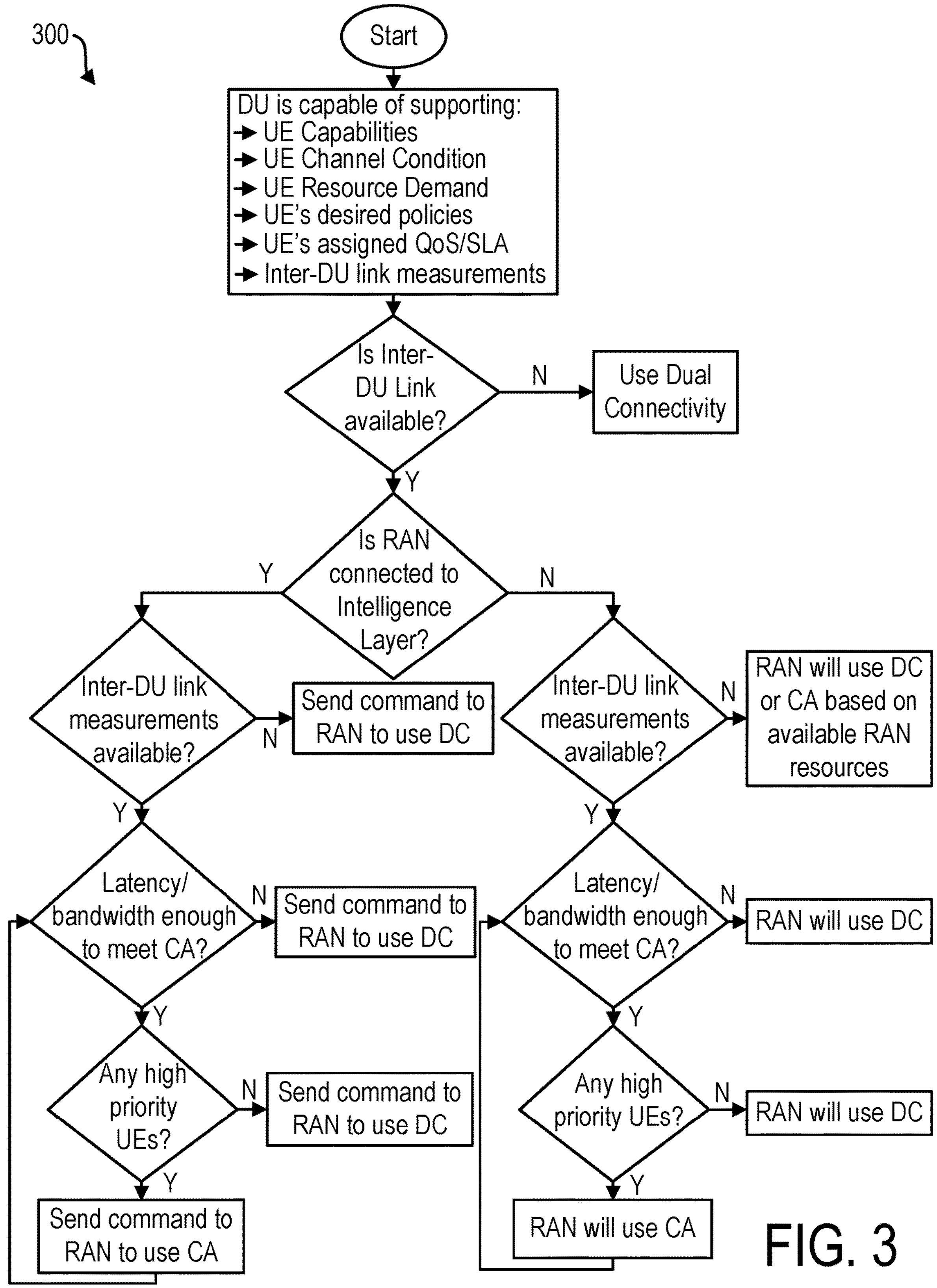
FIG. 3 illustrates a logical flow diagram showing an example process for dynamic carrier aggregation and dual connectivity switching based on availability of an inter-DU link and meeting latency/bandwidth criteria, in accordance with an example embodiment described herein.

FIG. 3 illustrates a logical flow diagram showing an example process 300 for dynamic carrier aggregation and dual connectivity switching based on availability of an inter-DU link and meeting latency/bandwidth criteria, in accordance with an example embodiment described herein.

As explained above, at the start of the process 300, the DU is capable of supporting, but is not limited to supporting, the following: UE capabilities; UE channel conditions; the UE's resource demand and desired policies; the UE's assigned Quality of Service (QOS)/Service Level Agreements (SLAs); inter-DU link measurements including, but not limited to, quality, latency, bandwidth availability, and current usage.

It is then determined whether an inter-DU link is available. If not, the process 300 proceeds to use DC. If so, the process 300 proceeds to determine whether the RAN is connected to an intelligence layer. Whether the RAN is connected to an intelligence layer determines how the system triggers switching to using CA or using DC in later steps in the process 300. If the RAN is connected to an intelligence layer, then the switch between CA and DC is made by the intelligence layer sending a command to the RAN to do so. If the RAN is not connected to an intelligence layer, then the switch between CA and DC is made by the RAN initiating and performing the switch.

Before determining whether to switch to use CA or using DC in later steps in the process 300, the process 300 determines whether there are inter-DU link measurements available. If not, and the RAN is connected to an intelligence layer, the process 300 will cause DC to be used solely. If there are not inter-DU link measurements available, and the RAN is not connected to an intelligence layer, the process 300 will cause DC or CA to be used based on available RAN resources.

If there are inter-DU link measurements available, the process 300 determines whether latency/bandwidth measurements are enough to meet criteria for using CA. If not, the process 300 causes the RAN to use DC. If so, the process 300 determines whether there are any high priority UEs. If not, then the process 300 causes the RAN to use DC. If so, then the process 300 causes the RAN to use CA. The process 300 may then return to determine whether latency/bandwidth measurements are enough to meet criteria for using CA to continuously monitor this and switch to using CA or DC accordingly.

Figure 4:
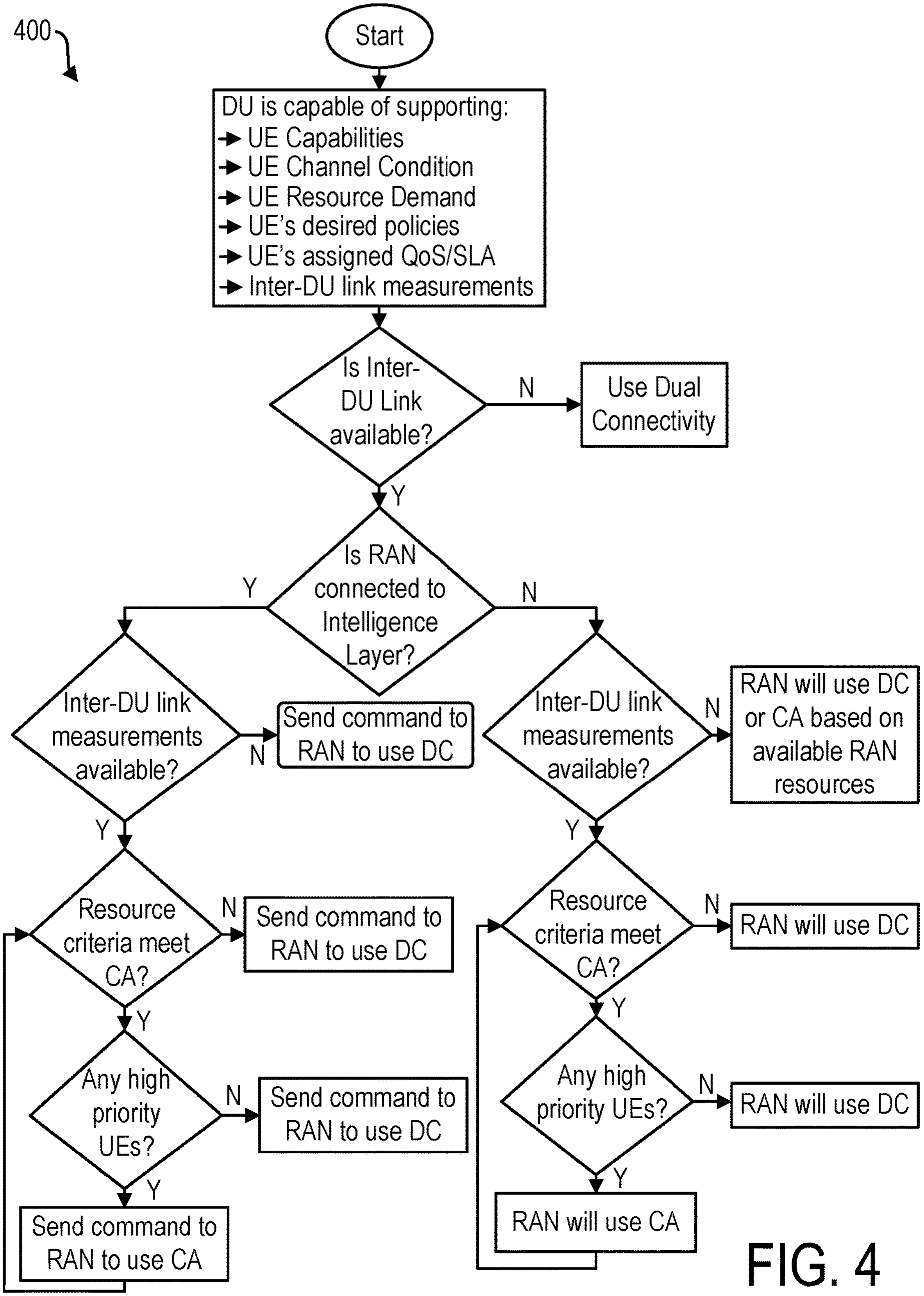
FIG. 4 illustrates a logical flow diagram showing an example process for dynamic carrier aggregation and dual connectivity switching based on availability of an inter-DU link and meeting resource criteria, in accordance with an example embodiment described herein.

FIG. 4 illustrates a logical flow diagram showing an example process 400 for dynamic carrier aggregation and dual connectivity switching based on availability of an inter-DU link and meeting resource criteria, in accordance with an example embodiment described herein.

As explained above, at the start of the process 400, the DU is capable of supporting, but is not limited to supporting, the following: UE capabilities; UE channel conditions; the UE's resource demand and desired policies; the UE's assigned Quality of Service (QOS)/Service Level Agreements (SLAs); inter-DU link measurements including, but not limited to, quality, latency, bandwidth availability, and current usage.

It is then determined whether an inter-DU link is available. If not, the process 400 proceeds to cause DC to be used. If so, the process 400 proceeds to determine whether the RAN is connected to an intelligence layer. Whether the RAN is connected to an intelligence layer determines how the system triggers switching to using CA or using DC in later steps in the process 400. If the RAN is connected to an intelligence layer, then the switch between CA and DC is made by the intelligence layer sending a command to the RAN to do so. If the RAN is not connected to an intelligence layer, then the switch between CA and DC is made by the RAN initiating and performing the switch.

Before determining whether to switch to use CA or using DC in later steps in the process 400, the process 400 determines whether there are inter-DU link measurements available. If not, and the RAN is connected to an intelligence layer, the process 400 will cause DC to be used solely. If there are not inter-DU link measurements available, and the RAN is not connected to an intelligence layer, the process 400 will cause DC or CA to be used based on available RAN resources.

If there are inter-DU link measurements available, the process 400 determines whether certain resource criteria are met for using CA. If not, the process 400 causes the RAN to use DC. If so, the process 400 determines whether there are any high priority UEs. If not, then the process 400 causes the RAN to use DC. If so, then the process 400 causes the RAN to use CA. The process 400 may then return to determine whether latency/bandwidth measurements are enough to meet criteria for using CA to continuously monitor this and switch to using CA or DC accordingly.

Figure 5:
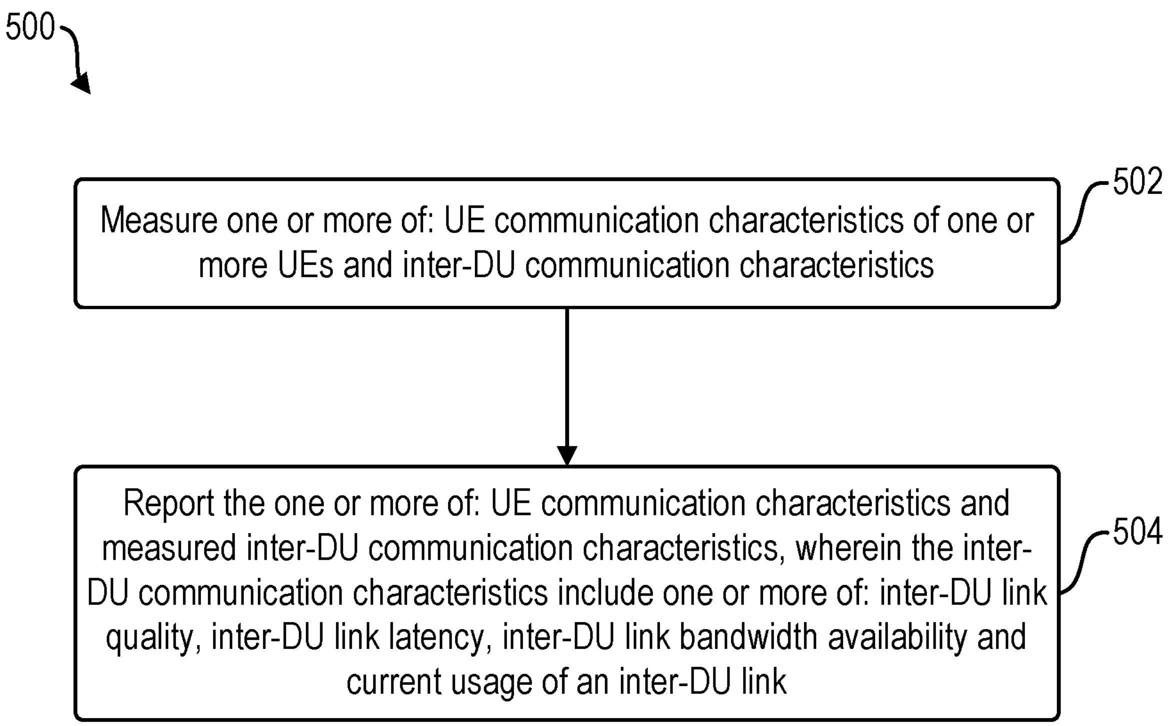
FIG. 5 illustrates a logical flow diagram showing an example process for providing measuring of and reporting particular items for dynamic carrier aggregation and dual connectivity switching, in accordance with an example embodiment described herein.

FIG. 5 illustrates a logical flow diagram showing an example process 500 for providing measuring of and reporting particular items for dynamic carrier aggregation and dual connectivity switching, in accordance with an example embodiment described herein.

At 502, the system electronically measures, via one or more Radio Access Network (RAN) functions, one or more of: user equipment (UE) communication characteristics of one or more UE devices (UEs) and inter-distributed unit (inter-DU) communication characteristics of communication between a plurality of distributed units (DUs) of a wireless cellular telecommunication network that provides wireless cellular telecommunication network services to the one or more UEs.

At 504, the system (e.g., via one or more Radio Access Network (RAN) functions) electronically reports the one or more of: UE communication characteristics and measured inter-DU communication characteristics. The causing switching to be performed may be based on the measured inter-DU communication characteristics. The inter-DU communication characteristics may include one or more of: inter-DU link quality, inter-DU link latency, inter-DU link bandwidth availability and current usage of an inter-DU link.

The system may further cause switching to be performed, based on the one or more of: UE communication characteristics and measured inter-DU communication characteristics, between using carrier aggregation across cells that are each managed by different respective DUs of the plurality of DUs and using dual connectivity for the cells that are each managed by different respective DUs of the plurality of DUs. The dual connectivity uses an F1 interface to split Packet Data Convergence Protocol (PDCP) packets across the different respective DUs.

In an example embodiment, the dual connectivity does not require any inter-DU communication.

In an example embodiment, the causing switching to be performed is based on the UE communication characteristics. The UE communication characteristics may include one or more of: UE capabilities, UE channel conditions, UE resource demand and desired policies of the one or more UEs and one or more characteristics regarding Quality of Service (QOS) or a service level agreement (SLA) assigned to the one or more UEs.

In an example embodiment, the electronically measuring one or more of: UE communication characteristics of one or more UEs and inter-DU communication characteristics includes at least measuring inter-DU communication characteristics.

In an example embodiment, the one or more RAN functions include functions of one or more of: a centralized unit (CU) of the wireless cellular telecommunication network and the plurality of DUs.

Figure 6:
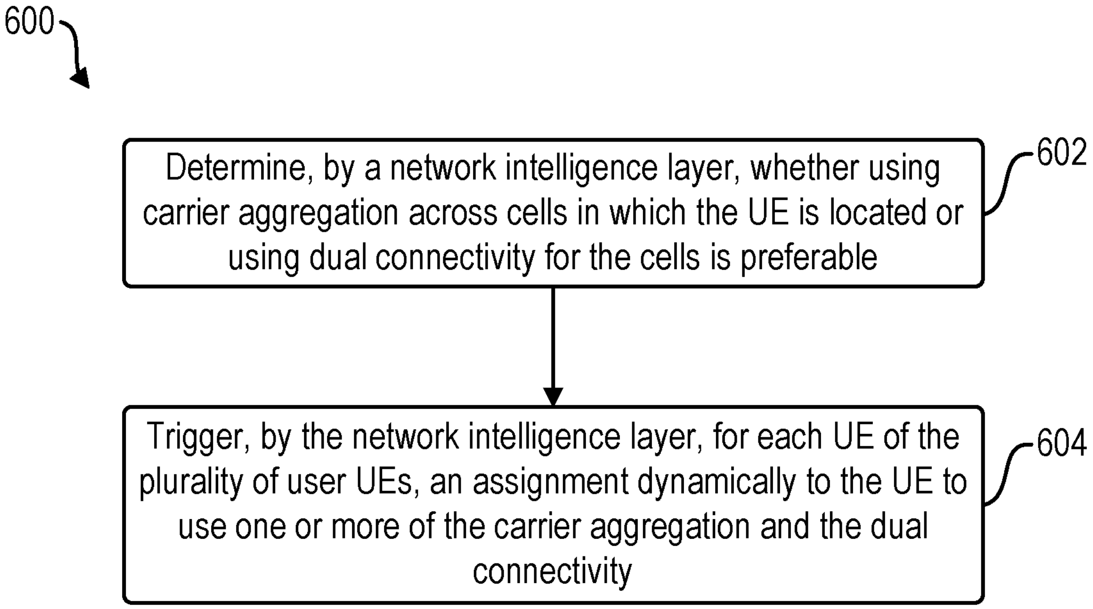
FIG. 6 illustrates a logical flow diagram showing an example process for dynamic carrier aggregation and dual connectivity switching with a network intelligence layer, in accordance with an example embodiment described herein.

FIG. 6 illustrates a logical flow diagram showing an example process 600 for dynamic carrier aggregation and dual connectivity switching with a network intelligence layer, in accordance with an example embodiment described herein.

At 602, the system electronically determines, by a network intelligence layer of a wireless cellular telecommunication network, for each user equipment device (UE) of a plurality of user UEs to which the wireless cellular telecommunication network provides services, whether using carrier aggregation across cells in which the UE is located and that are each managed by different respective distributed units (DUs) of a plurality of DUs in the wireless cellular telecommunication network or using dual connectivity for the cells is preferable. The dual connectivity may use an F1 interface to split Packet Data Convergence Protocol (PDCP) packets across the different respective DUs.

In an example embodiment, for each UE of the plurality of UEs, the determination whether using the carrier aggregation or using the dual connectivity is preferable is based on feedback from Radio Access Network (RAN) functions of the wireless cellular telecommunication network.

In an example embodiment, for each UE of the plurality of UEs, the determination whether using the carrier aggregation or using the dual connectivity is preferable is based on one or more of: UE communication characteristics of the UE and inter-distributed unit (inter-DU) communication characteristics of communication between the different respective DUs. For each UE of the plurality of UEs, the determination whether using the carrier aggregation or using the dual connectivity is preferable may include: the intelligence layer working with a centralized unit (CU) of the wireless cellular telecommunication network and the plurality of DUs to receive information regarding one or more of: the UE communication characteristics and the inter-DU communication characteristics.

At 604, the system triggers, by the network intelligence layer, for each UE of the plurality of user UEs, an assignment dynamically to the UE to use one or more of the carrier aggregation and the dual connectivity based on the determination. The triggering, for each UE of the plurality of user UEs, the assignment dynamically to the UE to use one or more of the carrier aggregation and the dual connectivity may include the network intelligence layer sending a command to a Radio Access Network (RAN) including the different respective DUs to use the one or more of the carrier aggregation and the dual connectivity.

In various example embodiments, the intelligence layer may be deployed: at a far edge location within the wireless cellular telecommunication network where a centralized unit (CU) of the wireless cellular telecommunication network is deployed or where one or more DUs of the plurality of DUs is deployed; at a data center of the wireless cellular telecommunication network where a centralized unit (CU) of the wireless cellular telecommunication network is deployed or where one or more DUs of the plurality of DUs is deployed; in a public cloud where: a centralized unit (CU) of the wireless cellular telecommunication network is deployed, where one or more DUs of the plurality of DUs is deployed, where network management functions of the wireless cellular telecommunication network are able to be deployed or where other network functions of the of the wireless cellular telecommunication network are able to be deployed; or at a location isolated from one or more of: a centralized unit (CU) of the wireless cellular telecommunication network, the plurality of DUs, network management functions of the wireless cellular telecommunication network and other network functions of the of the wireless cellular telecommunication network.

In an example embodiment, the intelligence layer is a sub-function of: a network orchestrator of the wireless cellular telecommunication network, a Radio Access Network (RAN) Intelligent Controller (RIC), or another entity that provides intelligent decisions based on feedback from RAN functions The determining whether using carrier aggregation across the cells or using dual connectivity for the cells is preferable may occur continuously. The triggering of the assignment to the UE to use one or more of the carrier aggregation and the dual connectivity may then occur dynamically based on this continuous determination.

Figure 7:
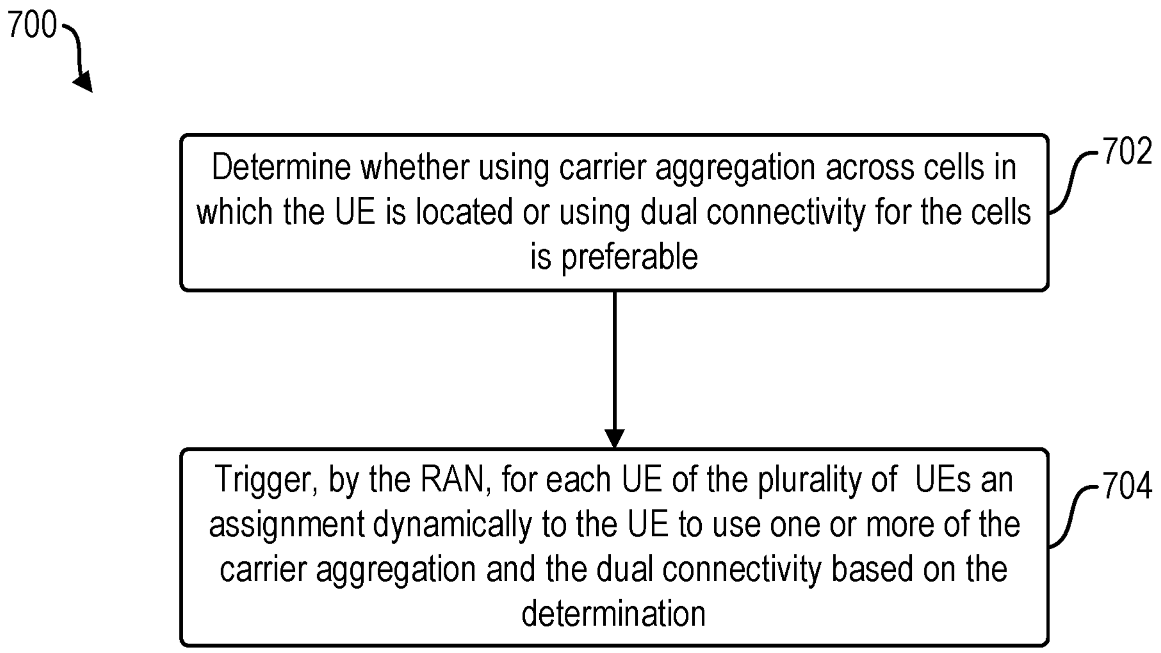
FIG. 7 illustrates a logical flow diagram showing an example process for dynamic carrier aggregation and dual connectivity switching without a network intelligence layer, in accordance with an example embodiment described herein.

FIG. 7 illustrates a logical flow diagram showing an example process 700 for dynamic carrier aggregation and dual connectivity switching without a network intelligence layer, in accordance with an example embodiment described herein.

At 702, the system electronically determining, by a Radio Access Network (RAN) of a wireless cellular telecommunication network, for each user equipment device (UE) of a plurality of user UEs to which the wireless cellular telecommunication network provides services, whether using carrier aggregation across cells in which the UE is located and that are each managed by different respective distributed units (DUs) of a plurality of DUs in the RAN or using dual connectivity for the cells is preferable. The dual connectivity may use an F1 interface to split Packet Data Convergence Protocol (PDCP) packets across the different respective DUs. For each UE of the plurality of UEs, the determination whether using the carrier aggregation or using the dual connectivity is preferable may be based on current resource availability for the cells. The current RAN resource availability for the cells may include one or more of: current central processing unit (CPU) resource availability, current memory availability and current radio spectrum availability.

In an example embodiment, for each UE of the plurality of UEs, the determination whether using the carrier aggregation or using the dual connectivity is preferable may be based on one or more of: UE communication characteristics of the UE and inter-distributed unit (inter-DU) communication characteristics of communication between the different respective DUs.

In an example embodiment, for each UE of the plurality of UEs, the determination whether using the carrier aggregation or using the dual connectivity is preferable may be based on information from the different respective DUs and a centralized unit (CU) of the RAN.

At 704, the system triggers, by the RAN, for each UE of the plurality of UEs, an assignment dynamically to the UE to use one or more of the carrier aggregation and the dual connectivity based on the determination.

In an example embodiment, the determining whether using carrier aggregation across the cells or using dual connectivity for the cells is preferable occurs continuously. The triggering of the assignment to the UE to use one or more of the carrier aggregation and the dual connectivity then occurs dynamically based on this continuous determination.

Figure 8:
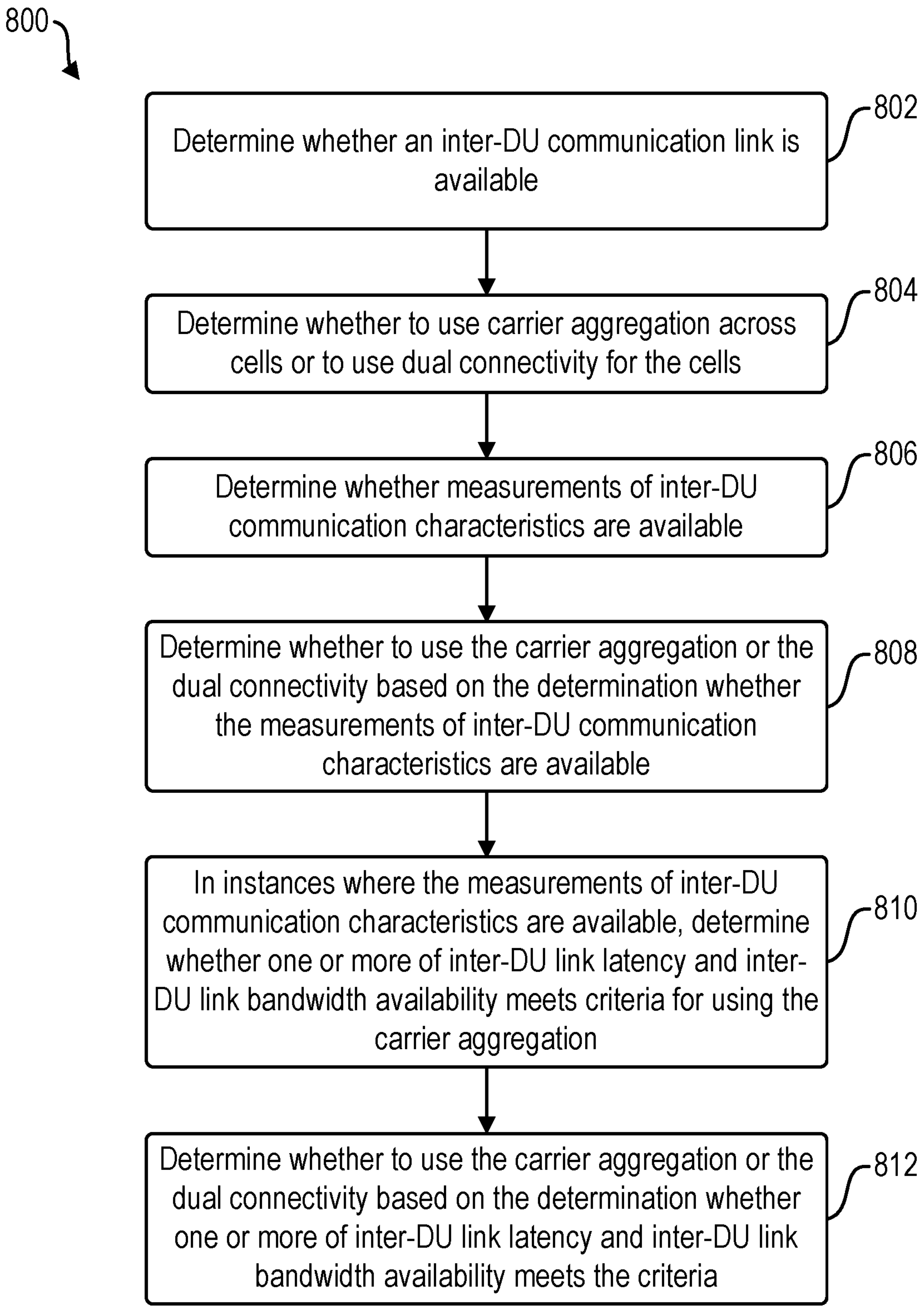
FIG. 8 illustrates a logical flow diagram of a higher level process of the process of FIG. 3 for dynamic carrier aggregation and dual connectivity switching based on availability of an inter-DU link and meeting latency/bandwidth criteria, in accordance with an example embodiment described herein.

FIG. 8 illustrates a logical flow diagram of a higher level process 800 of the process 300 of FIG. 3 for dynamic carrier aggregation and dual connectivity switching based on availability of an inter-DU link and meeting latency/bandwidth criteria, in accordance with an example embodiment described herein.

At 802, the system electronically determines whether an inter-distributed unit (inter-DU) communication link between a plurality of distributed units (DUs) in a Radio Access Network (RAN) of a wireless cellular telecommunication network that provides wireless cellular telecommunication network services to a plurality of UEs is available.

At 804, the system electronically determines whether to use carrier aggregation across cells that are each managed by different respective DUs of the plurality of DUs and or to use dual connectivity for the cells based on the determination whether an inter-DU communication link is available.

At 806, the system electronically determines whether measurements of inter-DU communication characteristics of communication between the plurality of DUs are available.

At 808, the system electronically determines whether to use the carrier aggregation or the dual connectivity based on the determination whether the measurements of inter-DU communication characteristics are available.

At 810, in instances where the measurements of inter-DU communication characteristics are determined to be available, the system determines, based on the measurements, whether one or more of inter-DU link latency and inter-DU link bandwidth availability meets criteria for using the carrier aggregation.

At 812, the system electronically determines whether to use the carrier aggregation or the dual connectivity based on the determination whether the one or more of inter-DU link latency and inter-DU link bandwidth availability meets the criteria.

The determining whether to use the carrier aggregation or to use the dual connectivity may be based on the determination whether an inter-DU communication link is available includes determining to use dual connectivity in response to a determination that an inter-DU communication link is not available.

The electronically determining whether to use the carrier aggregation or the dual connectivity based on the determination whether the measurements of inter-DU communication characteristics are available may include: determining to use the dual connectivity instead of the carrier aggregation in response to a determination that the measurements of inter-DU communication characteristics are not available, wherein the RAN is connected to an intelligence layer for determining whether to use the dual connectivity instead of the carrier aggregation.

The electronically determining whether to use the carrier aggregation or the dual connectivity based on the determination whether the measurements of inter-DU communication characteristics are available may include: determining whether to use the carrier aggregation or the dual connectivity based on current RAN resource availability for the cells instead of the measurements of inter-DU communication characteristics in response to a determination that the measurements of inter-DU communication characteristics are not available, wherein the RAN is not connected to an intelligence layer for determining whether to use the dual connectivity instead of the carrier aggregation. The current RAN resource availability may include one or more of: current central processing unit (CPU) resource availability, current memory availability and current radio spectrum availability.

The determining whether to use the carrier aggregation or the dual connectivity based on the determination whether one or more of inter-DU link latency and inter-DU link bandwidth availability meets the criteria may include: in response to a determination that one or more of inter-DU link latency and inter-DU link bandwidth availability does not meet the criteria, causing the dual connectivity to be used instead of the carrier aggregation. In an example embodiment, the RAN is connected to an intelligence layer for determining whether to use the dual connectivity instead of the carrier aggregation. The causing the dual connectivity to be used instead of the carrier aggregation then includes the intelligence layer sending a command to the RAN to use the dual connectivity. In an example embodiment, the RAN is not connected to an intelligence layer for determining whether to use the dual connectivity instead of the carrier aggregation. The causing the dual connectivity to be used instead of the carrier aggregation then includes the RAN using the dual connectivity in response to the determination that one or more of inter-DU link latency and inter-DU link bandwidth availability does not meet the criteria.

The determining whether to use the carrier aggregation or the dual connectivity based on the determination whether one or more of inter-DU link latency and inter-DU link bandwidth availability meets the criteria may include: in response to a determination that one or more of inter-DU link latency and inter-DU link bandwidth availability meets the criteria, determining whether any UEs of the plurality of UEs are high priority UEs. In response to a determination that none of the plurality of UEs are high priority UEs, the system may cause the dual connectivity to be used instead of the carrier aggregation. In an example embodiment, the RAN is connected to an intelligence layer for determining whether to use the dual connectivity instead of the carrier aggregation. The causing the dual connectivity to be used instead of the carrier aggregation then includes the intelligence layer sending a command to the RAN to use the dual connectivity in response to a determination none of the plurality of UEs are high priority UEs. In an example embodiment, the RAN is not connected to an intelligence layer for determining whether to use the dual connectivity instead of the carrier aggregation. The causing the dual connectivity to be used instead of the carrier aggregation then includes the RAN using the dual connectivity in response to a determination none of the plurality of UEs are high priority UEs.

In response to a determination one or more of the plurality of UEs are high priority UEs, the system may cause carrier aggregation to be used for the one or more of the plurality of UEs instead of dual connectivity. In an example embodiment, the RAN is connected to an intelligence layer for determining whether to use the dual connectivity instead of the carrier aggregation. The causing the carrier aggregation to be used for the one or more of the plurality of UEs instead of dual connectivity then includes the intelligence layer sending a command to the RAN to use the carrier aggregation for the one or more of the plurality of UEs instead of dual connectivity, in response to a determination the one or more of the plurality of UEs are high priority UEs. In an example embodiment, the RAN is not connected to an intelligence layer for determining whether to use the dual connectivity instead of the carrier aggregation. The causing the carrier aggregation to be used for the one or more of the plurality of UEs instead of dual connectivity then includes the RAN using the carrier aggregation for the one or more of the plurality of UEs instead of dual connectivity, in response to a determination the one or more of the plurality of UEs are high priority UEs.

In an example embodiment the system may continuously electronically determine whether to use the carrier aggregation or the dual connectivity based on continuous determinations whether the one or more of inter-DU link latency and inter-DU link bandwidth availability meets the criteria.

Figure 9:
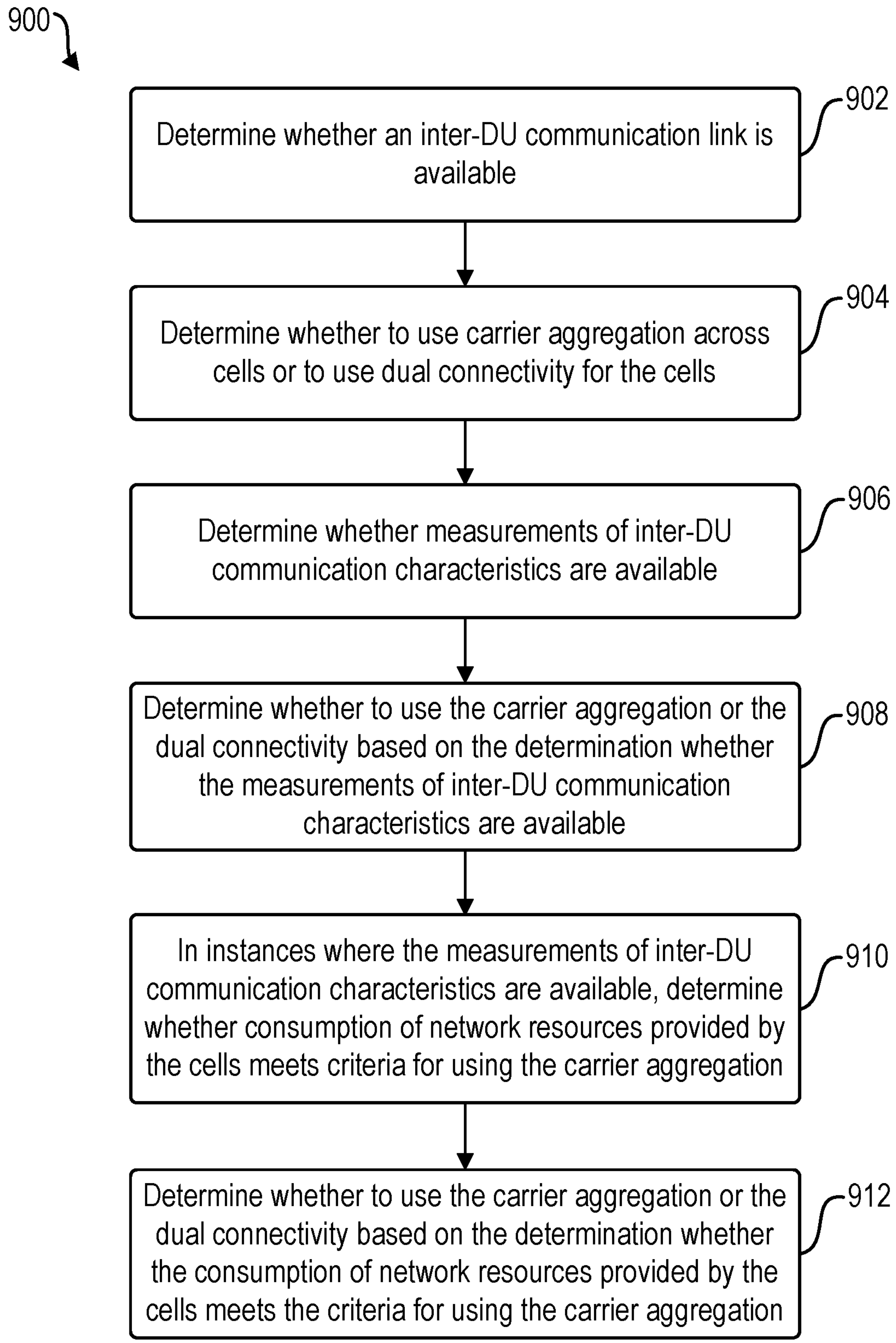
FIG. 9 illustrates a logical flow diagram of a higher level process of the process of FIG. 4 for dynamic carrier aggregation and dual connectivity switching based on availability of an inter-DU link and meeting resource criteria, in accordance with an example embodiment described herein.

FIG. 9 illustrates a logical flow diagram of a higher level process 900 of the process 400 of FIG. 4 for dynamic carrier aggregation and dual connectivity switching based on availability of an inter-DU link and meeting resource criteria, in accordance with an example embodiment described herein.

At 902, the system electronically determines whether an inter-distributed unit (inter-DU) communication link between a plurality of distributed units (DUs) in a Radio Access Network (RAN) of a wireless cellular telecommunication network that provides wireless cellular telecommunication network services to a plurality of UEs is available.

At 904, the system electronically determines whether to use carrier aggregation across cells that are each managed by different respective DUs of the plurality of DUs and or to use dual connectivity for the cells based on the determination whether an inter-DU communication link is available.

At 906, the system electronically determines whether measurements of inter-DU communication characteristics of communication between the plurality of DUs are available.

At 908, the system electronically determines whether to use the carrier aggregation or the dual connectivity based on the determination whether the measurements of inter-DU communication characteristics are available.

At 910, in instances where the measurements of inter-DU communication characteristics are determined to be available, the system determines, based on the measurements, whether consumption of network resources provided by the cells meets criteria for using the carrier aggregation.

At 912, the system electronically determines whether to use the carrier aggregation or the dual connectivity based on the determination whether the consumption of network resources provided by the cells meets the criteria for using the carrier aggregation.

The determining whether to use the carrier aggregation or to use the dual connectivity may be based on the determination whether an inter-DU communication link is available includes determining to use dual connectivity in response to a determination that an inter-DU communication link is not available.

The electronically determining whether to use the carrier aggregation or the dual connectivity based on the determination whether the measurements of inter-DU communication characteristics are available may include: determining to use the dual connectivity instead of the carrier aggregation in response to a determination that the measurements of inter-DU communication characteristics are not available, wherein the RAN is connected to an intelligence layer for determining whether to use the dual connectivity instead of the carrier aggregation.

The electronically determining whether to use the carrier aggregation or the dual connectivity based on the determination whether the measurements of inter-DU communication characteristics are available may include: determining whether to use the carrier aggregation or the dual connectivity based on current RAN resource availability for the cells instead of the measurements of inter-DU communication characteristics in response to a determination that the measurements of inter-DU communication characteristics are not available, wherein the RAN is not connected to an intelligence layer for determining whether to use the dual connectivity instead of the carrier aggregation. The current RAN resource availability may include one or more of:

current central processing unit (CPU) resource availability, current memory availability and current radio spectrum availability.

The determining whether to use the carrier aggregation or the dual connectivity based on the determination whether consumption of network resources provided by the cells meets criteria for using the carrier aggregation may include: in response to a determination that the consumption of network resources provided by the cells does not meet criteria for using the carrier aggregation, causing the dual connectivity to be used instead of the carrier aggregation. In an example embodiment, the RAN is connected to an intelligence layer for determining whether to use the dual connectivity instead of the carrier aggregation. The causing the dual connectivity to be used instead of the carrier aggregation then includes the intelligence layer sending a command to the RAN to use the dual connectivity. In an example embodiment, the RAN is not connected to an intelligence layer for determining whether to use the dual connectivity instead of the carrier aggregation. The causing the dual connectivity to be used instead of the carrier aggregation then includes the RAN using the dual connectivity in response to the determination that consumption of network resources provided by the cells does not meet criteria for using the carrier aggregation.

The determining whether to use the carrier aggregation or the dual connectivity based on the determination whether consumption of network resources provided by the cells meets criteria for using the carrier aggregation may include: in response to a determination that consumption of network resources provided by the cells meets the criteria for using the carrier aggregation, determining whether any UEs of the plurality of UEs are high priority UEs. In response to a determination that none of the plurality of UEs are high priority UEs, the system may cause the dual connectivity to be used instead of the carrier aggregation. In an example embodiment, the RAN is connected to an intelligence layer for determining whether to use the dual connectivity instead of the carrier aggregation. The causing the dual connectivity to be used instead of the carrier aggregation then includes the intelligence layer sending a command to the RAN to use the dual connectivity in response to a determination none of the plurality of UEs are high priority UEs. In an example embodiment, the RAN is not connected to an intelligence layer for determining whether to use the dual connectivity instead of the carrier aggregation. The causing the dual connectivity to be used instead of the carrier aggregation then includes the RAN using the dual connectivity in response to a determination none of the plurality of UEs are high priority UEs.

In response to a determination one or more of the plurality of UEs are high priority UEs, the system may cause carrier aggregation to be used for the one or more of the plurality of UEs instead of dual connectivity. In an example embodiment, the RAN is connected to an intelligence layer for determining whether to use the dual connectivity instead of the carrier aggregation. The causing the carrier aggregation to be used for the one or more of the plurality of UEs instead of dual connectivity then includes the intelligence layer sending a command to the RAN to use the carrier aggregation for the one or more of the plurality of UEs instead of dual connectivity, in response to a determination the one or more of the plurality of UEs are high priority UEs. In an example embodiment, the RAN is not connected to an intelligence layer for determining whether to use the dual connectivity instead of the carrier aggregation. The causing the carrier aggregation to be used for the one or more of the plurality of UEs instead of dual connectivity then includes the RAN using the carrier aggregation for the one or more of the plurality of UEs instead of dual connectivity, in response to a determination the one or more of the plurality of UEs are high priority UEs.

In an example embodiment, the criteria for using the carrier aggregation includes criteria for equalizing load distribution on the cells by using carrier aggregation to offload UE traffic on certain cells managed by the plurality of DUs that are overutilized compared to other cells managed by the plurality of DUs.

In an example embodiment, the determining whether consumption of network resources provided by the cells meets criteria for using the carrier aggregation may include: determining, for each UE of the plurality of UE, a percentage of current consumption of total network resources provided by one or more cells in which the UE is located; determining, for each UE of the plurality of UE, whether the determined current percentage of consumption of total network resources is below a threshold percentage; and determining consumption of network resources provided by the cells meets criteria for using the carrier aggregation based on a determination that the determined current percentage of consumption of total network resources is below the threshold percentage.

In an example embodiment, the system may continuously electronically determine whether to use the carrier aggregation or the dual connectivity based on continuous determinations whether the one or more of inter-DU link latency and inter-DU link bandwidth availability meets the criteria.

Figure 10:
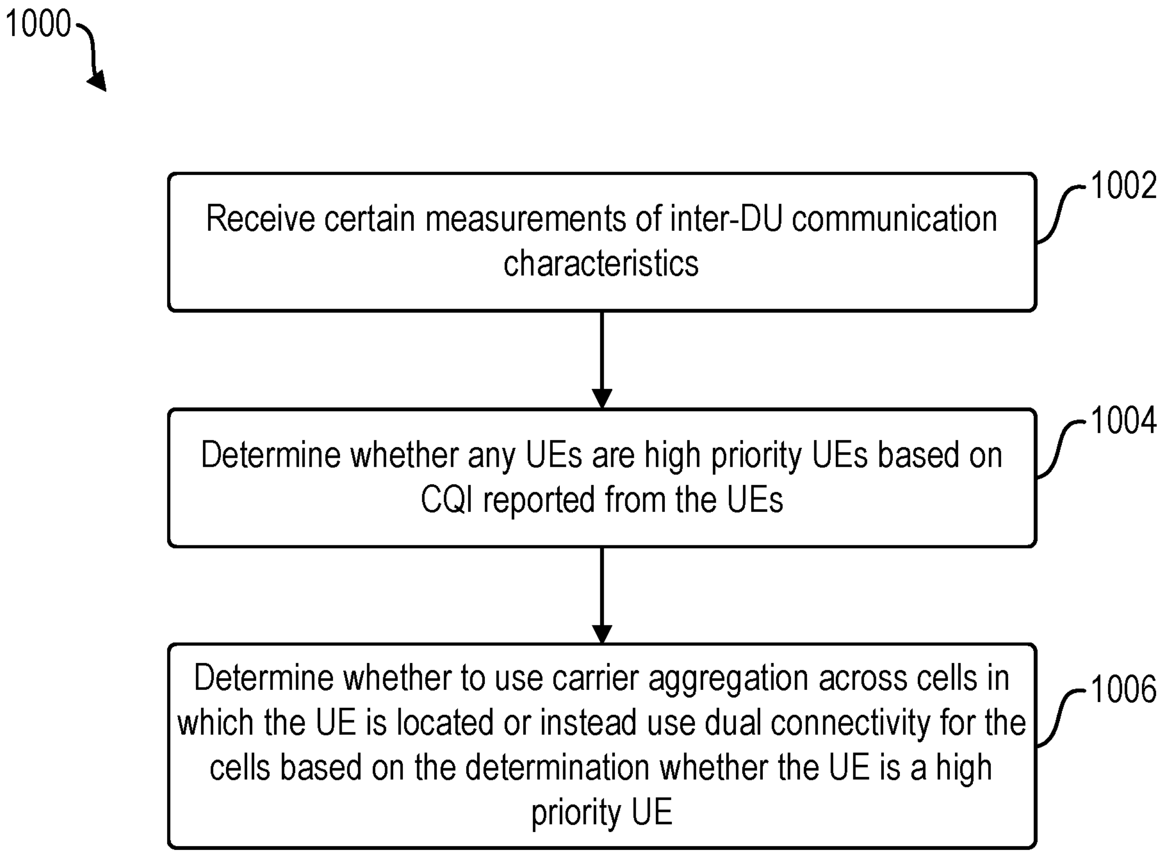
FIG. 10 illustrates a logical flow diagram showing an example process for prioritization for using carrier aggregation instead of dual connectivity based on channel quality information (CQI), in accordance with an example embodiment described herein.

FIG. 10 illustrates a logical flow diagram showing an example process 1000 for prioritization for using carrier aggregation instead of dual connectivity based on channel quality information (CQI), in accordance with an example embodiment described herein. The dual connectivity may use an F1 interface to split Packet Data Convergence Protocol (PDCP) packets across different respective distributed units (DUs) of the plurality of DUs managing the cells.

At 1002, the system receives certain measurements of inter-distributed unit (inter-DU) communication characteristics of communication between a plurality of distributed units (DUs) managing cells in a Radio Access Network (RAN) of a wireless cellular telecommunication network. The cells provide wireless cellular telecommunication network services to a plurality of UEs.

At 1004, the system, in response to a determination that certain measurements of inter-DU communication characteristics meet certain criteria, determines whether any UEs of the plurality of UEs are high priority UEs based on channel quality information (CQI) reported from the UEs At 1006, the system, for each UE of the plurality of UEs that is located within the cells, electronically determines whether to use carrier aggregation across cells in which the UE is located or instead use dual connectivity for the cells based on the determination whether the UE is a high priority UE. The electronically determining whether to use carrier aggregation across cells in which the UE is located may be based on the CQI indicating how close to an edge of a cell the UE is. The electronically determining whether to use carrier aggregation across cells in which the UE is located may include determining to use carrier aggregation across cells in which the UE is located instead of using dual connectivity for the cells based on the UE being located closer to an edge of a cell relative to one or more other UEs or a reference point. A lower CQI reported from the UE generally indicates the UE is closer to the edge of the cell than a higher CQI reported from the UE.

In an example embodiment, the electronically determining whether to use carrier aggregation across cells in which the UE is located may include determining to use carrier aggregation across cells in which the UE is located instead of using dual connectivity for the cells based on the CQI indicating the UE is located closer to an edge of a cell relative to one or more other UEs or a reference point. The system may use carrier aggregation across cells in which the UE is located instead of using dual connectivity for the cells to provide larger coverage area for the UE based on the CQI indicating the UE is located closer to an edge of a cell relative to one or more other UEs or a reference point.

Figure 11:
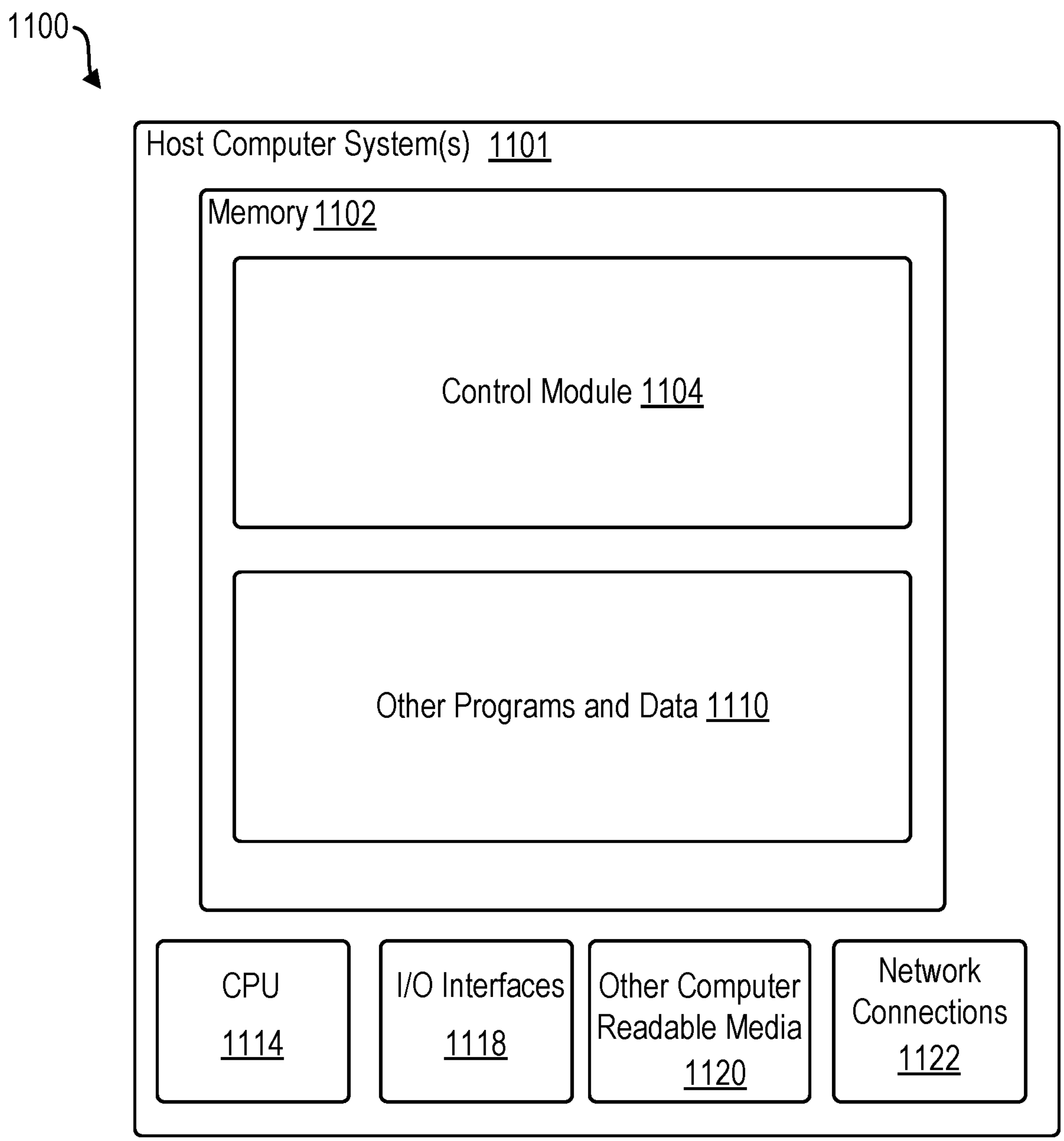
FIG. 11 shows a system diagram that describes an example implementation of a computing system(s) for implementing embodiments described herein.

FIG. 11 shows a system diagram that describes an example implementation of a computing system(s) 1100 for implementing embodiments described herein.

The functionality described herein for carrier aggregation and dual connectivity switching in a cellular network, or components thereof, can be implemented either on dedicated hardware, as a software instance running n dedicated hardware, or as a virtualized function instantiated on an appropriate platform, e.g., a cloud infrastructure. In some embodiments, such functionality may be completely software-based and designed as cloud-native, meaning that they're agnostic to the underlying cloud infrastructure, allowing higher deployment agility and flexibility. However, FIG. 11 illustrates an example of underlying hardware on which such software and functionality may be hosted and/or implemented.

In particular, shown is example host computer system(s) 1101. For example, such computer system(s) 1101 may represent those in various data centers and cell sites shown and/or described herein that host the functions, components, microservices and other aspects described herein to implement carrier aggregation and dual connectivity switching in a cellular network. In some embodiments, one or more special-purpose computing systems may be used to implement the functionality described herein. Accordingly, various embodiments described herein may be implemented in software, hardware, firmware, or in some combination thereof. Host computer system(s) 1101 may include memory 1102, one or more central processing units (CPUs) 1114, I/O interfaces 1118, other computer-readable media 1120, and network connections 1122.

Memory 1102 may include one or more various types of non-volatile and/or volatile storage technologies. Examples of memory 1102 may include, but are not limited to, flash memory, hard disk drives, optical drives, solid-state drives, various types of random access memory (RAM), various types of read-only memory (ROM), other computer-readable storage media (also referred to as processor-readable storage media), or the like, or any combination thereof. Memory 1102 may be utilized to store information, including computer-readable instructions that are utilized by CPU 1114 to perform actions, including those of embodiments described herein.

Memory 1102 may have stored thereon control module(s) 1104. The control module(s) 1104 may be configured to implement and/or perform some or all of the functions of the systems, components and modules described herein for carrier aggregation and dual connectivity switching in a cellular network. Memory 1102 may also store other programs and data 1110, which may include rules, databases, application programming interfaces (APIs), software platforms, cloud computing service software, intelligence layer software, network management software, network orchestrator software, network functions (NF), AI or ML programs or models to perform the functionality described herein, user interfaces, operating systems, other network management functions, other NFs, etc.

Network connections 1122 are configured to communicate with other computing devices to facilitate the functionality described herein. In various embodiments, the network connections 1122 include transmitters and receivers (not illustrated), cellular telecommunication network equipment and interfaces, and/or other computer network equipment and interfaces to send and receive data as described herein, such as to send and receive instructions, commands and data to implement the processes described herein. I/O interfaces 1118 may include a video interfaces, other data input or output interfaces, or the like. Other computer-readable media 1120 may include other types of stationary or removable computer-readable media, such as removable flash drives, external hard drives, or the like.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method comprising electronically determining whether an inter-distributed unit (inter-DU) communication link between a plurality of distributed units (DUs) in a Radio Access Network (RAN) of a wireless cellular telecommunication network that provides wireless cellular telecommunication network services to a plurality of UEs is available;

electronically determining whether to use carrier aggregation across cells that are each managed by different respective DUs of the plurality of DUs and or to use dual connectivity for the cells based on the determination whether an inter-DU communication link is available;

electronically determining whether measurements of inter-DU communication characteristics of communication between the plurality of DUs are available;

electronically determining whether to use the carrier aggregation or the dual connectivity based on the determination whether the measurements of inter-DU communication characteristics are available;

in instances where the measurements of inter-DU communication characteristics are determined to be available, determining, based on the measurements, whether one or more of inter-DU link latency and inter-DU link bandwidth availability meets criteria for using the carrier aggregation; and electronically determining whether to use the carrier aggregation or the dual connectivity based on the determination whether the one or more of inter-DU link latency and inter-DU link bandwidth availability meets the criteria.

2. The method of claim 1 wherein the determining whether to use the carrier aggregation or to use the dual connectivity based on the determination whether an inter-DU communication link is available includes determining to use dual connectivity in response to a determination that an inter-DU communication link is not available.

3. The method of claim 1 wherein the electronically determining whether to use the carrier aggregation or the dual connectivity based on the determination whether the measurements of inter-DU communication characteristics are available includes:

determining to use the dual connectivity instead of the carrier aggregation in response to a determination that the measurements of inter-DU communication characteristics are not available, wherein the RAN is connected to an intelligence layer for determining whether to use the dual connectivity instead of the carrier aggregation.

4. The method of claim 1 wherein the electronically determining whether to use the carrier aggregation or the dual connectivity based on the determination whether the measurements of inter-DU communication characteristics are available includes:

determining whether to use the carrier aggregation or the dual connectivity based on current RAN resource availability for the cells instead of the measurements of inter-DU communication characteristics in response to a determination that the measurements of inter-DU communication characteristics are not available, wherein the RAN is not connected to an intelligence layer for determining whether to use the dual connectivity instead of the carrier aggregation.

5. The method of claim 4 wherein the current RAN resource availability includes one or more of: current central processing unit (CPU) resource availability, current memory availability and current radio spectrum availability.

6. The method of claim 1 wherein the determining whether to use the carrier aggregation or the dual connectivity based on the determination whether one or more of inter-DU link latency and inter-DU link bandwidth availability meets the criteria includes:

in response to a determination that one or more of inter-DU link latency and inter-DU link bandwidth availability does not meet the criteria, causing the dual connectivity to be used instead of the carrier aggregation.

7. The method of claim 6 wherein:

the RAN is connected to an intelligence layer for determining whether to use the dual connectivity instead of the carrier aggregation; and the causing the dual connectivity to be used instead of the carrier aggregation includes the intelligence layer sending a command to the RAN to use the dual connectivity.

8. The method of claim 6 wherein:

the RAN is not connected to an intelligence layer for determining whether to use the dual connectivity instead of the carrier aggregation; and the causing the dual connectivity to be used instead of the carrier aggregation includes the RAN using the dual connectivity in response to the determination that one or more of inter-DU link latency and inter-DU link bandwidth availability does not meet the criteria.

9. The method of claim 1 wherein the determining whether to use the carrier aggregation or the dual connectivity based on the determination whether one or more of inter-DU link latency and inter-DU link bandwidth availability meets the criteria includes:

in response to a determination that one or more of inter-DU link latency and inter-DU link bandwidth availability meets the criteria, determining whether any UEs of the plurality of UEs are high priority UEs.

10. The method of claim 9, further comprising:

in response to a determination none of the plurality of UEs are high priority UEs, causing the dual connectivity to be used instead of the carrier aggregation.

11. The method of claim 10 wherein:

the RAN is connected to an intelligence layer for determining whether to use the dual connectivity instead of the carrier aggregation; and the causing the dual connectivity to be used instead of the carrier aggregation includes the intelligence layer sending a command to the RAN to use the dual connectivity in response to a determination none of the plurality of UEs are high priority UEs.

12. The method of claim 10 wherein:

the RAN is not connected to an intelligence layer for determining whether to use the dual connectivity instead of the carrier aggregation; and the causing the dual connectivity to be used instead of the carrier aggregation includes the RAN using the dual connectivity in response to a determination none of the plurality of UEs are high priority UEs.

13. The method of claim 9, further comprising:

in response to a determination one or more of the plurality of UEs are high priority UEs, causing carrier aggregation to be used for the one or more of the plurality of UEs instead of dual connectivity.

14. The method of claim 13 wherein:

the RAN is connected to an intelligence layer for determining whether to use the dual connectivity instead of the carrier aggregation; and the causing the carrier aggregation to be used for the one or more of the plurality of UEs instead of dual connectivity includes the intelligence layer sending a command to the RAN to use the carrier aggregation for the one or more of the plurality of UEs instead of dual connectivity, in response to a determination the one or more of the plurality of UEs are high priority UEs.

15. The method of claim 13 wherein:

the RAN is not connected to an intelligence layer for determining whether to use the dual connectivity instead of the carrier aggregation; and the causing the carrier aggregation to be used for the one or more of the plurality of UEs instead of dual connectivity includes the RAN using the carrier aggregation for the one or more of the plurality of UEs instead of dual connectivity, in response to a determination the one or more of the plurality of UEs are high priority UEs.

16. The method of claim 1, further comprising:

continuously electronically determining whether to use the carrier aggregation or the dual connectivity based on continuous determinations whether the one or more of inter-DU link latency and inter-DU link bandwidth availability meets the criteria.

17. A method comprising electronically determining whether an inter-distributed unit (inter-DU) communication link between a plurality of distributed units (DUs) in a Radio Access Network (RAN) of a wireless cellular telecommunication network that provides wireless cellular telecommunication network services to a plurality of UEs is available;

electronically determining whether to use carrier aggregation across cells that are each managed by different respective DUs of the plurality of DUs and or to use dual connectivity for the cells based on the determination whether an inter-DU communication link is available;

electronically determining whether measurements of inter-DU communication characteristics of communication between the plurality of DUs are available;

electronically determining whether to use the carrier aggregation or the dual connectivity based on the determination whether the measurements of inter-DU communication characteristics are available;

in instances where the measurements of inter-DU communication characteristics are determined to be available, determining, based on the measurements, whether consumption of network resources provided by the cells meets criteria for using the carrier aggregation; and electronically determining whether to use the carrier aggregation or the dual connectivity based on the determination whether the consumption of network resources provided by the cells meets the criteria for using the carrier aggregation.

18. The method of claim 17 wherein the determining whether to use the carrier aggregation or the dual connectivity based on the determination whether consumption of network resources provided by the cells meets criteria for using the carrier aggregation includes:

in response to a determination that consumption of network resources provided by the cells does not meet the criteria for using the carrier aggregation, causing the dual connectivity to be used instead of the carrier aggregation.

19. The method of claim 17 wherein the criteria for using the carrier aggregation includes criteria for equalizing load distribution on the cells by using carrier aggregation to offload UE traffic on certain cells managed by the plurality of DUs that are overutilized compared to other cells managed by the plurality of DUs.

20. The method of claim 17 wherein the determining whether consumption of network resources provided by the cells meets criteria for using the carrier aggregation includes:

determining, for each UE of the plurality of UE, a percentage of current consumption of total network resources provided by one or more cells in which the UE is located;

determining, for each UE of the plurality of UE, whether the determined current percentage of consumption of total network resources is below a threshold percentage; and determining consumption of network resources provided by the cells meets criteria for using the carrier aggregation based on a determination that the determined current percentage of consumption of total network resources is below the threshold percentage.

* * * * *